US012733672B2

(12) United States Patent
He

(10) Patent No.: US 12,733,672 B2
(45) Date of Patent: Sep. 15, 2026

(54) CIGARETTE ADDITIVE, PREPARATION METHOD AND APPLICATION THEREOF

(71) Applicant: Changde Jizhi Biological Technology Co., Ltd, Changde (CN)

(72) Inventor: Xinqiao He, Changde (CN)

(73) Assignee: Changde Jizhi Biological Technology Co., Ltd, Changde (CN)

( * ) Notice: Subject to any disclaimer, the term of this patent is extended or adjusted under 35 U.S.C. 154(b) by 385 days.

(21) Appl. No.: 18/467,737

(22) Filed: Sep. 15, 2023

(65) Prior Publication Data

US 2025/0089761 A1 Mar. 20, 2025

(51) Int. Cl.

*A24B 15/28* (2006.01)
*A01N 59/16* (2006.01)
*A01P 1/00* (2006.01)

(52) U.S. Cl.

CPC ............ *A24B 15/286* (2013.01); *A01N 59/16* (2013.01); *A01P 1/00* (2021.08); *A24B 15/287* (2013.01)

(58) Field of Classification Search

CPC ..... A24B 15/42; A24B 15/308; A24B 15/305; A24B 15/303; A24B 15/302; A24B 15/286; A24B 15/28; A24B 15/287

See application file for complete search history.

(56) References Cited

U.S. PATENT DOCUMENTS

2017/0172200 A1* 6/2017 White ................ B65D 85/1081
2021/0213091 A1* 7/2021 Docherty ........... A61K 31/4439
2022/0324715 A1* 10/2022 Saripalli ................ A24B 15/16

FOREIGN PATENT DOCUMENTS

CN 115067541 A 9/2020

* cited by examiner

*Primary Examiner* — Alex B Efta
(74) *Attorney, Agent, or Firm* — Hemisphere Law, PLLC

(57) ABSTRACT

A broad-spectrum antiviral and anti-inflammatory cigarette additive, a preparation method and an application thereof are provided. The cigarette additive includes: soy protein powder, chlorophyll, propylene glycol, vegetable glycerin, eucommia ulmoides, structured water, multivitamin iron oral solution, chitosan, zinc oxide nanoparticles, titanium dioxide nanoparticles, bovine bone collagen peptide powder, fish skin collagen peptide powder, shark chondroitin, mucor powder, and yeast powder. The cigarette additive is added into cut tobacco of a cigarette, a cigarette filter, or a fog-absorbing rod of an electronic cigarette, thereby realizing filer and conversion of various harmful compounds and gases. In addition, various inflammations such as stomatitis, pharyngolaryngitis, and pneumonia, and cancers can be prevented and treated by smoking the cigarette with the additive. Moreover, bacteria and viruses in air can be killed by second-hand smoke indoors, reducing an emission of TVOC, achieving mildew-proof effect, and prolonging cigarette preservation time.

18 Claims, No Drawings

CIGARETTE ADDITIVE, PREPARATION METHOD AND APPLICATION THEREOF

STATEMENT REGARDING PRIOR DISCLOSURES BY THE INVENTOR OR A JOINT INVENTOR

Chinese Publication No. CN115067541A dated Sep. 20, 2022 is a grace period inventor-originated disclosure which qualifies as an exception under 35 U.S.C. 102(b) (1).

TECHNICAL FIELD

The disclosure relates to the technical field of environmental protection, particularly to a cigarette additive, a preparation method and an application thereof.

BACKGROUND

At present, cigarette additives used in tobacco processing enterprises are mostly chemical compounds, components of which are generally complex. When the cigarette additives are added into tobaccos, the tobaccos are burned into gas entering human body or discharged into air. However, some of the chemical compounds are harmful to human health and cause a multiplication on environmental air pollution, resulting in harmful to other people's health. In addition, due to the fact that the chemical compounds are expensive, cigarette cost is increased accordingly.

A cigarette additive provided by the disclosure is a broad-spectrum antiviral, bacteriostatic, and anti-inflammatory nanomaterial. The cigarette additive provided by the disclosure is capable of being added into cut tobacco of a cigarette, a cigarette filter, or a fog-absorbing rod of an electronic cigarette. In addition, the cigarette additive can filter and convert various harmful compounds and gases. Furthermore, inhalation of the cigarette additive can reduce an emission of total volatile organic compounds (TVOC). The disclosure can also protect the cigarettes from mildew, greatly improving preservation time of the cigarettes, and providing beneficial effects for human health.

SUMMARY

An objective of the disclosure is to provide a broad-spectrum antiviral and anti-inflammatory cigarette additive (also referred to an antiviral and anti-inflammatory cigarette additive), including the following components in parts by weight: 1-5 parts of soy protein powder,1-3 parts of chlorophyll, 3-10 parts of propylene glycol, 3-10 parts of vegetable glycerin, 1-3 parts of eucommia ulmoides, 5-15 parts of structured water (also referred to small molecular group water, micro cluster water, small cluster water, or micro clustered water; and within 100 hertz abbreviated as Hz, the structured water being composed of 5-7 water molecules), 1-3 parts of multivitamin iron oral solution, 1-3 parts of chitosan, 3-10 parts of zinc oxide nanoparticles, 3-10 parts of titanium dioxide nanoparticles, 1-3 parts of bovine bone collagen peptide powder, 1-4 parts of fish skin collagen peptide powder, 1-3 parts of shark chondroitin, 1-3 parts of mucor powder, and 1-5 parts of yeast powder.

In an embodiment of the disclosure, a weight ratio of the titanium dioxide nanoparticles to the mucor powder is 2-5:1; specially, the weight ratio of the titanium dioxide nanoparticles to the mucor powder is 3:1.

In an embodiment of the disclosure, the cigarette additive includes the following components in parts by weight: 3 parts of the soy protein powder, 2 parts of the chlorophyll, 5 parts of the propylene glycol, 6 parts of the vegetable glycerin, 2 parts of the eucommia ulmoides, 10 parts of the structured water, 2 parts of the multivitamin iron oral solution, 1.5 parts of the chitosan, 6 parts of the zinc oxide nanoparticles, 6 parts of the titanium dioxide nanoparticles, 2 parts of the bovine bone collagen peptide powder, 2.2 parts of the fish skin collagen peptide powder, 1.8 parts of the shark chondroitin, 1-3 parts of the mucor powder and 1.5 parts of the yeast powder.

Another objective of the disclosure provides a preparation method of the above-mentioned broad-spectrum antiviral and anti-inflammatory cigarette additive, including the following steps:

- step 1, taking the eucommia ulmoides by weight, and then cleaning and crushing for juicing to obtain eucommia ulmoides liquid for later use;
- step 2, taking the soy protein powder, the chlorophyll, the bovine bone collagen peptide powder, the fish skin collagen peptide powder, the shark chondroitin, and the multivitamin iron oral solution by weights, followed by adding into the eucommia ulmoides liquid obtained in the step 1, uniformly stirring, adding the yeast powder in proportion to stir uniformly to obtain mixed solution, pouring the mixed solution into a fermentation tank to ferment for 7 days at 25-32 degrees Celsius (° C.), and then pressurizing and filtering to obtain fermentation broth;
- step 3, taking the zinc oxide nanoparticles and the titanium dioxide nanoparticles by weights for calcination to obtain calcined zinc oxide nanoparticles and calcined titanium dioxide nanoparticles, placing the calcined zinc oxide nanoparticles and the calcined titanium dioxide nanoparticles in a sand mill to obtain a mixture, and then adding the structured water into the mixture and grinding the mixture added with the structured water for 6-8 hours (h) to make particle sizes of the calcined zinc oxide nanoparticles and the calcined titanium dioxide nanoparticles as 40-60 nanometers (nm), followed by adding the chitosan in proportion, and uniformly stirring to obtain nano solution; and
- step 4, mixing the fermentation broth obtained in the step 2 and the nano solution obtained in the step 3, and then uniformly stirring, followed by adding the propylene glycol and the vegetable glycerin in proportion, uniformly stirring, and then adding the mucor powder in proportion, and uniformly stirring to obtain the broad-spectrum antiviral and anti-inflammatory cigarette additive.

Still another objective of the disclosure provides an application of the broad-spectrum antiviral and anti-inflammatory cigarette additive or the broad-spectrum antiviral and anti-inflammatory cigarette additive prepared by the preparation method in an ordinary cigarette and an electronic cigarette. The cigarette additive provided by the disclosure can be added into cut tobacco of the ordinary cigarette, a cigarette filter, or a fog-absorbing rod of the electronic cigarette.

Beneficial effects of the disclosure are as follows.

The disclosure provides the broad-spectrum antiviral and anti-inflammatory cigarette additive, the preparation method and the application thereof. The broad-spectrum antiviral and anti-inflammatory cigarette additive prepared by the disclosure is capable of being added into the cut tobacco of the ordinary cigarette, the cigarette filter, or the fog-absorbing rod of the electronic cigarette, thereby reducing the emission of TVOC. Furthermore, the antibacterial effect is significantly improved and the emission of TVOC is also reduced by adjusting the ratio of the titanium dioxide nanoparticles to the mucor powder, because that the titanium dioxide nanoparticles and the mucor powder have a synergistic effect. In addition, the cigarette additive provided by the disclosure can also protect the cigarette from the mildew, prolonging the preservation time of the cigarette.

DETAILED DESCRIPTION OF EMBODIMENTS

In order to enable technical means, technical features, objectives, and effects achieved by the disclosure to be easily understood, the disclosure is further illustrated below in conjunction with illustrated embodiments, but the following embodiments are merely some of the embodiments of the disclosure and are not all of the embodiments. Other embodiments can be obtained by those skilled in the related art based on the embodiments provided by the disclosure without creative efforts, all of which fall within the scope of the protection of the disclosure.

Implementation methods in the following embodiments, unless otherwise specified, are conventional methods. Furthermore, materials, reagents, etc. used in the following embodiments, unless otherwise specified, are available through commercial means.

Embodiment 1

A broad-spectrum antiviral and anti-inflammatory cigarette additive and a preparation method thereof are provided as follows.

The broad-spectrum antiviral and anti-inflammatory cigarette additive includes the following components in parts by weight: 1 part of soy protein powder, 1 part of chlorophyll, 3 parts of propylene glycol, 3 parts of vegetable glycerin, 1 part of eucommia ulmoides, 5 parts of structured water, 1 part of multivitamin iron oral solution, 1 part of chitosan, 3 parts of zinc oxide nanoparticles, 3 parts of titanium dioxide nanoparticles, 1 part of bovine bone collagen peptide powder, 1 part of fish skin collagen peptide powder, 1 part of shark chondroitin, 1 part of mucor powder, and 1 part of yeast powder. Specially, the structured water can be also referred to small molecular group water, micro cluster water, small cluster water, or micro clustered water; and within 100 hertz (Hz), the structured water is composed of 5-7 water molecules.

The preparation method of the broad-spectrum antiviral and anti-inflammatory cigarette additive includes the following steps.

Step 1, the fresh eucommia ulmoides is taken according to its corresponding weight (also referred to the above-mentioned parts by weight), washed, crushed and juiced to obtain eucommia ulmoides liquid for later use.

Step 2, the soy protein powder, the chlorophyll, the bovine bone collagen peptide powder, the fish skin collagen peptide powder, the shark chondroitin, and the multivitamin iron oral solution are taken by their corresponding weights and added into the eucommia ulmoides liquid obtained in the step 1, followed by uniformly stirring, and then the yeast powder is added into the eucommia ulmoides liquid in proportion (i.e., the above-mentioned parts by weight) with uniform stirring to obtain mixed solution, the mixed solution is then poured into a fermentation tank to ferment for 7 days at 25 degrees Celsius (° C.), and then fermentation broth is obtained by pressurizing and filtering.

Step 3, the zinc oxide nanoparticles and the titanium dioxide nanoparticles are taken by their corresponding weights for calcination, after then, the calcined zinc oxide nanoparticles and the calcined titanium dioxide nanoparticles are placed in a sand mill, and then the structured water is added into the sand mill for grinding for 6 hours (h) to make particle sizes of the calcined zinc oxide nanoparticles and the calcined titanium dioxide nanoparticles as 60 nanometers (nm), followed by adding the chitosan in proportion to the sand mill accompanied with uniform stirring to obtain nano solution.

Step 4, the fermentation broth obtained in the step 2 and the nano solution obtained in the step 3 are mixed together by uniform stirring, and then the propylene glycol and the vegetable glycerin are sequentially added in proportion with uniform stirring, followed by adding the mucor powder in proportion with uniform stirring to obtain the broad-spectrum antiviral and anti-inflammatory cigarette additive.

Embodiment 2

A broad-spectrum antiviral and anti-inflammatory cigarette additive and a preparation method thereof are provided as follows.

The broad-spectrum antiviral and anti-inflammatory cigarette additive includes the following components in parts by weight: 3 parts of soy protein powder, 2 parts of chlorophyll, 5 parts of propylene glycol, 6 parts of vegetable glycerin, 2 parts of eucommia ulmoides, 10 parts of structured water, 2 parts of multivitamin iron oral solution, 1.5 parts of chitosan, 6 parts of zinc oxide nanoparticles, 6 parts of titanium dioxide nanoparticles, 2 parts of bovine bone collagen peptide powder, 2.2 parts of fish skin collagen peptide powder, 1.8 parts of shark chondroitin, 2 parts of mucor powder, and 1.5 parts of yeast powder. Namely, a weight ratio of the titanium dioxide nanoparticles to the mucor powder is 3:1.

The preparation method of the broad-spectrum antiviral and anti-inflammatory cigarette additive includes the following steps.

Step 1, the fresh eucommia ulmoides is taken according to its corresponding weight, washed, crushed and juiced to obtain eucommia ulmoides liquid for later use.

Step 2, the soy protein powder, the chlorophyll, the bovine bone collagen peptide powder, the fish skin collagen peptide powder, the shark chondroitin, and the multivitamin iron oral solution are taken by their corresponding weights and added into the eucommia ulmoides liquid obtained in the step 1, followed by uniformly stirring, and then the yeast powder is added into the eucommia ulmoides liquid in proportion with uniform stirring to obtain mixed solution, the mixed solution is then poured into a fermentation tank to ferment for 7 days at 28° C., and then fermentation broth is obtained by pressurizing and filtering.

Step 3, the zinc oxide nanoparticles and the titanium dioxide nanoparticles are taken by their corresponding weights for calcination, after then, the calcined zinc oxide nanoparticles and the calcined titanium dioxide nanoparticles are placed in a sand mill, and then the structured water is added into the sand mill for grinding for 7 h to make particle sizes of the calcined zinc oxide nanoparticles and the calcined titanium dioxide nanoparticles as 50 nm, followed by adding the chitosan in proportion to the sand mill accompanied with uniform stirring to obtain nano solution.

Step 4, the fermentation broth obtained in the step 2 and the nano solution obtained in the step 3 are mixed together by uniform stirring, and then the propylene glycol and the vegetable glycerin are sequentially added in proportion with uniform stirring, followed by adding the mucor powder in proportion with uniform stirring to obtain the broad-spectrum antiviral and anti-inflammatory cigarette additive.

Embodiment 3

A broad-spectrum antiviral and anti-inflammatory cigarette additive and a preparation method thereof are provided as follows.

The broad-spectrum antiviral and anti-inflammatory cigarette additive includes the following components in parts by weight: 5 parts of soy protein powder, 3 parts of chlorophyll, 10 parts of propylene glycol, 10 parts of vegetable glycerin, 3 parts of eucommia ulmoides, 15 parts of structured water, 3 parts of multivitamin iron oral solution, 3 parts of chitosan, 10 parts of zinc oxide nanoparticles, 10 parts of titanium dioxide nanoparticles, 3 parts of bovine bone collagen peptide powder, 4 parts of fish skin collagen peptide powder, 3 parts of shark chondroitin, 3 parts of mucor powder, and 5 parts of yeast powder.

The preparation method of the broad-spectrum antiviral and anti-inflammatory cigarette additive includes the following steps.

Step 1, the fresh eucommia ulmoides is taken according to its corresponding weight, washed, crushed and juiced to obtain eucommia ulmoides liquid for later use.

Step 2, the soy protein powder, the chlorophyll, the bovine bone collagen peptide powder, the fish skin collagen peptide powder, the shark chondroitin, and the multivitamin iron oral solution are taken by their corresponding weights and added into the eucommia ulmoides liquid obtained in the step 1, followed by uniformly stirring, and then the yeast powder is added into the eucommia ulmoides liquid in proportion with uniform stirring to obtain mixed solution, the mixed solution is then poured into a fermentation tank to ferment for 7 days at 32° C., and then fermentation broth is obtained by pressurizing and filtering.

Step 3, the zinc oxide nanoparticles and the titanium dioxide nanoparticles are taken by their corresponding weights for calcination, after then, the calcined zinc oxide nanoparticles and the calcined titanium dioxide nanoparticles are placed in a sand mill, and then the structured water is added into the sand mill for grinding for 8 h to make particle sizes of the calcined zinc oxide nanoparticles and the calcined titanium dioxide nanoparticles as 40 nm, followed by adding the chitosan in proportion to the sand mill accompanied with uniform stirring to obtain nano solution.

Step 4, the fermentation broth obtained in the step 2 and the nano solution obtained in the step 3 are mixed together by uniform stirring, and then the propylene glycol and the vegetable glycerin are sequentially added in proportion with uniform stirring, followed by adding the mucor powder in proportion with uniform stirring to obtain the broad-spectrum antiviral and anti-inflammatory cigarette additive.

Embodiment 4

A broad-spectrum antiviral and anti-inflammatory cigarette additive and a preparation method thereof are provided as follows.

Compared with the embodiment 2, a difference only lies as follows. The parts by weight of the titanium dioxide nanoparticles are 8.8 parts and the parts by weight of the mucor powder are 2.2 parts, that is, the weight ratio of the titanium dioxide nanoparticles to the mucor powder is 4:1.

Embodiment 5

A broad-spectrum antiviral and anti-inflammatory cigarette additive and a preparation method thereof are provided as follows.

Compared with the embodiment 2, a difference only lies as follows. The parts by weight of the titanium dioxide nanoparticles are 7.5 parts and the parts by weight of the mucor powder are 1.5 parts, that is, the weight ratio of the titanium dioxide nanoparticles to the mucor powder is 5:1.

Comparative Embodiment 1

A broad-spectrum antiviral and anti-inflammatory cigarette additive and a preparation method thereof are provided as follows.

Compared with the embodiment 2, a difference is that the titanium dioxide nanoparticles are not added.

Comparative Embodiment 2

A broad-spectrum antiviral and anti-inflammatory cigarette additive and a preparation method thereof are provided as follows.

Compared with the embodiment 2, a difference is that the mucor powder is not added.

Test Embodiment 1

Clinical trials on anti-inflammatory effects:

The cigarette additives prepared from the above embodiments 1-5 and the comparative embodiments 1-2 are added to the cut tobacco of the ordinary cigarettes according to a weight ratio of 5% to prepare cigarettes containing the cigarette additives of the embodiments 1-5 and the comparative embodiments 1-2.

Patients who smoke and suffer from stomatitis, pharyngolaryngitis, and pneumonia are randomly selected. A number of the patients suffered from the stomatitis, the pharyngolaryngitis, and the pneumonia, respectively, is eighty. And then, the patients with each symptom (i.e., stomatitis, pharyngolaryngitis, and pneumonia) are randomly divided into 8 groups, each of which is provided with 10 patients. The 8 groups are named after experimental groups 1-7 and a control group, respectively. The experimental groups 1-7 use the cigarettes containing the cigarette additives prepared by the embodiments 1-5 and the comparative embodiments 1-2, respectively, and the control group uses the ordinary cigarette without any cigarette additive. Each patient smokes three cigarettes per day, and the experimental period is 2 days.

Therapeutic criteria are as follows: cured represents that inflammation disappears; effective represents that inflammation is effectively reduced; and ineffective represents that symptoms are invalid.

Treatment status of the patients suffered from stomatitis, pharyngolaryngitis, and pneumonia are counted respectively. The statistical result is shown in Table 1.

Table 1 illustrates the treatment status of the patients suffered from stomatitis, pharyngolaryngitis, and pneumonia as follows:

| Group | | Experimental group 1 | Experimental group 2 | Experimental group 3 | Experimental group 4 | Experimental group 5 | Experimental group 6 | Experimental group 7 | Control group |
|---|---|---|---|---|---|---|---|---|---|
| Stomatitis | Cured | 1 | 8 | 3 | 6 | 5 | 0 | 0 | 0 |
| | Effective | 9 | 2 | 7 | 4 | 5 | 4 | 5 | 1 |
| | Ineffective | 0 | 0 | 0 | 0 | 0 | 6 | 5 | 9 |
| Pharyngo-laryngitis | Cured | 1 | 9 | 4 | 7 | 6 | 0 | 0 | 0 |
| | Effective | 9 | 1 | 6 | 3 | 4 | 5 | 6 | 0 |
| | Ineffective | 0 | 0 | 0 | 0 | 0 | 5 | 4 | 10 |
| Pneumonia | Cured | 0 | 1 | 0 | 0 | 0 | 0 | 0 | 0 |
| | Effective | 5 | 9 | 6 | 9 | 7 | 3 | 4 | 0 |
| | Ineffective | 5 | 0 | 4 | 1 | 3 | 7 | 6 | 10 |

It can be seen from Table 1 that the ordinary cigarette has no anti-inflammatory effect, and after the cigarette additives provided by the disclosure are added, the patients smoke the cigarettes, thereby relieving the symptoms of the stomatitis, the pharyngolaryngitis, and the pneumonia, and achieving cured effects after long-term use. In addition, the disclosure also provides clinical trials for inflammation such as tracheitis, bronchitis, and other inflammations, and the disclosure also illustrates the anti-inflammatory effects.

Test Embodiment 2

Experimental study on antibacterial disinfection effects of indoor air:

The cigarette additives prepared from the above embodiments 1-5 and the comparative embodiments 1-2 are added to the cut tobacco of the ordinary cigarettes according to a weight ratio of 5%, thereby preparing the cigarettes containing the cigarette additives obtained from the embodiments 1-5 and the comparative embodiments 1-2.

Experimental groups 1-7 use the cigarettes containing the cigarette additives obtained from the embodiments 1-5 and the comparative embodiments 1-2, respectively, and a control group uses the ordinary cigarette without additives. Volunteers respectively light a cigarette (i.e., preparing in the experimental groups 1-7 and the control group, respectively) in an enclosed room, i.e., the room is with the same size in the experimental groups 1-7 and the control group. After the cigarettes are burnt out, a liquid impact sampler is used to collect indoor bacteria, and a quantity of the bacteria is detected, thereby obtaining results as shown in Table 2. Meanwhile, the content of TVOC in each room is detected, thereby obtaining results as shown in Table 3.

Table 2 illustrates the indoor bacterial content as follows:

| Group | Bacterial content (cfu/m$^3$) |
|---|---|
| Experimental group 1 | 1,734 |
| Experimental group 2 | 983 |
| Experimental group 3 | 1,596 |
| Experimental group 4 | 1,188 |
| Experimental group 5 | 1,372 |
| Experimental group 6 | 1,902 |
| Experimental group 7 | 2,148 |
| Control group | 2,465 |

Table 3 illustrates indoor TVOC contect as follows:

| Group | TVC content (mg/m$^3$) |
|---|---|
| Experimental group 1 | 0.86 |
| Experimental group 2 | 0.31 |
| Experimental group 3 | 0.73 |
| Experimental group 4 | 0.49 |
| Experimental group 5 | 0.57 |
| Experimental group 6 | 1.07 |
| Experimental group 7 | 1.42 |
| Control group | 1.71 |

It can be seen from Table 2 and Table 3 that after the cigarette additives prepared by the disclosure are added to the ordinary cigarettes, second-hand smoke released indoors can effectively eliminate the bacteria in the air of the rooms, thereby reducing the emission of TVOC. Comparing the embodiments 2, 4, and 5 with the comparative embodiments 1-2, it is found that by adjusting the ratio of the titanium dioxide nanoparticles to the mucor powder, the antibacterial effects can be obviously enhanced and the indoor TVOC content can be reduced, thereby indicating that the titanium dioxide nanoparticles and the mucor powder have a synergistic effect.

In addition, it has been found through the various tests that the cigarette additive provided by the disclosure also has the effects of cancer suppression and cancer prevention, and also has a mildew-proof effect. Compared with the ordinary cigarettes, the cigarette added with the additive provided by the disclosure is not prone to mildewing, and the preservation time of the cigarette added with the additive provided by the disclosure is about 2 months longer than that of the ordinary cigarette.

Apparently, the above-mentioned embodiments are merely illustrated embodiments used for clearly describing the disclosure, and are not intended to limit the embodiments of the disclosure. The objective of the disclosure is to enable those skilled in the related art to understand the contents of the disclosure and implement the contents according to the disclosure, and the embodiments above cannot limit the scope of the protection of the disclosure. Any modification, equivalent replacement and improvement made within the spirit and principle of the disclosure shall fall within the scope of the protection of the disclosure.

What is claimed is:

1. An antiviral and anti-inflammatory cigarette additive, comprising the following components in parts by weight: 1-5 parts of soy protein powder, 1-3 parts of chlorophyll, 3-10 parts of propylene glycol, 3-10 parts of vegetable glycerin, 1-3 parts of eucommia ulmoides, 5-15 parts of water having an average cluster size of 5-7 water molecules, 1-3 parts of multivitamin iron oral solution, 1-3 parts of chitosan, 3-10 parts of zinc oxide nanoparticles, 3-10 parts of titanium dioxide nanoparticles, 1-3 parts of bovine bone collagen peptide powder, 1-4 parts of fish skin collagen peptide powder, 1-3 parts of shark chondroitin, 1-3 parts of mucor powder, and 1-5 parts of yeast powder.

2. The antiviral and anti-inflammatory cigarette additive as claimed in claim 1, wherein a weight ratio of the titanium dioxide nanoparticles to the mucor powder is 2-5:1.

3. The antiviral and anti-inflammatory cigarette additive as claimed in claim 1, wherein the cigarette additive comprises the following components in parts by weight: 3 parts of the soy protein powder, 2 parts of the chlorophyll, 5 parts of the propylene glycol, 6 parts of the vegetable glycerin, 2 parts of the eucommia ulmoides, 10 parts of the water, 2 parts of the multivitamin iron oral solution, 1.5 parts of the chitosan, 6 parts of the zinc oxide nanoparticles, 6 parts of the titanium dioxide nanoparticles, 2 parts of the bovine bone collagen peptide powder, 2.2 parts of the fish skin collagen peptide powder, 1.8 parts of the shark chondroitin, 1-3 parts of the mucor powder, and 1.5 parts of the yeast powder.

4. The antiviral and anti-inflammatory cigarette additive as claimed in claim 1, wherein the cigarette additive comprises the following components in parts by weight: 3 parts of the soy protein powder, 2 parts of the chlorophyll, 5 parts of the propylene glycol, 6 parts of the vegetable glycerin, 2 parts of the eucommia ulmoides, 10 parts of the water, 2 parts of the multivitamin iron oral solution, 1.5 parts of the chitosan, 6 parts of the zinc oxide nanoparticles, 6 parts of the titanium dioxide nanoparticles, 2 parts of the bovine bone collagen peptide powder, 2.2 parts of the fish skin collagen peptide powder, 1.8 parts of the shark chondroitin, 2 parts of the mucor powder, and 1.5 parts of the yeast powder.

5. The antiviral and anti-inflammatory cigarette additive as claimed in claim 4, wherein a weight ratio of the titanium dioxide nanoparticles to the mucor powder is 3:1.

6. A preparation method of the antiviral and anti-inflammatory cigarette additive as claimed in claim 1, wherein the preparation method comprises the following steps:

step 1, taking the eucommia ulmoides by weight, and then cleaning and crushing for juicing to obtain eucommia ulmoides liquid for later use;

step 2, taking the soy protein powder, the chlorophyll, the bovine bone collagen peptide powder, the fish skin collagen peptide powder, the shark chondroitin, and the multivitamin iron oral solution by weights, followed by adding into the eucommia ulmoides liquid obtained in the step 1, uniformly stirring, adding the yeast powder in proportion to stir uniformly to obtain mixed solution, pouring the mixed solution into a fermentation tank to ferment for 7 days at 25-32 degrees Celsius (° C.), and then pressurizing and filtering to obtain fermentation broth;

step 3, taking the zinc oxide nanoparticles and the titanium dioxide nanoparticles by weights for calcination to obtain calcined zinc oxide nanoparticles and calcined titanium dioxide nanoparticles, placing the calcined zinc oxide nanoparticles and the calcined titanium dioxide nanoparticles in a sand mill to obtain a mixture, and then adding the water into the mixture and grinding the mixture added with the water for 6-8 hours (h) to make particle sizes of the calcined zinc oxide nanoparticles and the calcined titanium dioxide nanoparticles as 40-60 nanometers (nm), followed by adding the chitosan in proportion, and uniformly stirring to obtain nano solution; and step 4, mixing the fermentation broth obtained in the step 2 and the nano solution obtained in the step 3, and then uniformly stirring, followed by adding the propylene glycol and the vegetable glycerin in proportion, uniformly stirring, and then adding the mucor powder in proportion, and uniformly stirring to obtain the antiviral and anti-inflammatory cigarette additive.

7. The preparation method as claimed in claim 6, wherein a weight ratio of the titanium dioxide nanoparticles to the mucor powder is 2-5:1.

8. A preparation method of the antiviral and anti-inflammatory cigarette additive as claimed in claim 5, wherein the preparation method comprises the following steps:

step 1, taking the components according to the parts by weight; and cleaning and crushing the eucommia ulmoides for juicing to obtain eucommia ulmoides liquid;

step 2, adding the soy protein powder, the chlorophyll, the bovine bone collagen peptide powder, the fish skin collagen peptide powder, the shark chondroitin, and the multivitamin iron oral solution into the eucommia ulmoides liquid and uniformly stirring, and then adding the yeast powder into the eucommia ulmoides liquid and uniformly stirring to obtain mixed solution, pouring the mixed solution into a fermentation tank and fermenting the mixed solution for 7 days at 25-32° C., and then pressurizing and filtering to obtain fermentation broth;

step 3, calcining the zinc oxide nanoparticles and the titanium dioxide nanoparticles to obtain calcined zinc oxide nanoparticles and calcined titanium dioxide nanoparticles, placing the calcined zinc oxide nanoparticles and the calcined titanium dioxide nanoparticles in a sand mill to obtain a mixture, and then adding the water into the mixture and grinding the mixture added with the water for 6-8 h to make particle sizes of the calcined zinc oxide nanoparticles and the calcined titanium dioxide nanoparticles as 40-60 nm, followed by adding the chitosan, and uniformly stirring to obtain nano solution; and step 4, mixing and uniformly stirring the fermentation broth and the nano solution, followed by adding the propylene glycol and the vegetable glycerin and uniformly stirring, and then adding the mucor powder and uniformly stirring to obtain the antiviral and anti-inflammatory cigarette additive.

9. The preparation method as claimed in claim 8, wherein a temperature of the fermenting the mixed solution in the step 2 is 28° C.

10. The preparation method as claimed in claim 8, wherein a time for the grinding the mixture added with the water in the step 3 is 7 h.

11. The preparation method as claimed in claim 8, wherein the particle sizes of the calcined zinc oxide nanoparticles and the calcined titanium dioxide nanoparticles in the step 3 are 50 nm.

12. An application method of the antiviral and anti-inflammatory cigarette additive as claimed in claim 1, comprising: adding the antiviral and anti-inflammatory cigarette additive into cut tobacco of a cigarette.

13. The application method as claimed in claim 12, wherein a weight ratio of the antiviral and anti-inflammatory cigarette additive to the cut tobacco is 5%.

14. An application method of the antiviral and anti-inflammatory cigarette additive as claimed in claim 1, comprising: adding the antiviral and anti-inflammatory cigarette additive into a cigarette filter.

15. An application method of the antiviral and anti-inflammatory cigarette additive prepared by the preparation method as claimed in claim 6, comprising: adding the antiviral and anti-inflammatory cigarette additive into cut tobacco of a cigarette.

16. The application method as claimed in claim 15, wherein a weight ratio of the antiviral and anti-inflammatory cigarette additive to the cut tobacco is 5%.

17. An application method of the antiviral and anti-inflammatory cigarette additive prepared by the preparation method as claimed in claim 6, comprising: adding the antiviral and anti-inflammatory cigarette additive into a cigarette filter.

18. An application method of the antiviral and anti-inflammatory cigarette additive prepared by the preparation method as claimed in claim 8, comprising: adding the antiviral and anti-inflammatory cigarette additive into one of cut tobacco of a cigarette or a cigarette filter.

* * * * *